United States Patent
Narita et al.

(10) Patent No.: US 12,367,898 B2
(45) Date of Patent: Jul. 22, 2025

(54) MAGNETIC DEVICE, MAGNETIC HEAD, AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoyuki Narita, Funabashi Chiba (JP); Masayuki Takagishi, Tokyo (JP); Yuji Nakagawa, Kawasaki Kanagawa (JP); Tomoyuki Maeda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/440,247

(22) Filed: Feb. 13, 2024

(65) Prior Publication Data

US 2025/0087234 A1   Mar. 13, 2025

(30) Foreign Application Priority Data

Sep. 8, 2023   (JP) .................. 2023-146097

(51) Int. Cl.
*G11B 5/00* (2006.01)
*G11B 5/31* (2006.01)
*H01F 10/32* (2006.01)

(52) U.S. Cl.
CPC ....... *G11B 5/3146* (2013.01); *H01F 10/3286* (2013.01); *G11B 2005/0024* (2013.01)

(58) Field of Classification Search
CPC .................. G11B 5/3146; G11B 5/314; G11B 2005/0024; G11B 2005/0021;
(Continued)

(56) References Cited

U.S. PATENT DOCUMENTS 11,393,493 B1 *  7/2022  Nakagawa ............. G11B 5/193
2022/0270641 A1   8/2022  Nakagawa et al.

FOREIGN PATENT DOCUMENTS

JP   2022-123251   8/2022
JP   2022-129730   9/2022

OTHER PUBLICATIONS

Jian-Gang (Jimmy) Zhu, "Efficiency Enhanced Microwave Assisted Magnetic Recording", pp. 46-47.

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic device includes a magnetic element including a first magnetic layer and a second magnetic layer, and a magnetic field generator. The magnetic field generator is configured to perform a first transition operation and a second transition operation. In the first transition operation, a first state where a first magnetic field is generated is configured to transit to a second state where a second magnetic field is generated. In the second transition operation, the second state is configured to transit to the first state. The first magnetic field includes a first component in a first orientation from the first magnetic layer to the second magnetic layer. The second magnetic field includes a second component in a second orientation from the second magnetic layer to the first magnetic layer.

18 Claims, 5 Drawing Sheets

(58) Field of Classification Search
CPC ........... G11B 17/34; G11B 5/012; G11B 5/09;
G11B 5/59627; G11B 5/3503; G11B 5/40
USPC .......................................................... 360/59
See application file for complete search history.

MAGNETIC DEVICE, MAGNETIC HEAD, AND MAGNETIC RECORDING DEVICE

CROSS-REFERENCE TO RELATED APPLICATIONS

This application is based upon and claims the benefit of priority from Japanese Patent Application No. 2023-146097, filed on Sep. 8, 2023; the entire contents of which are incorporated herein by reference.

FIELD

Embodiments described herein relate generally to a magnetic device, a magnetic head, and a magnetic recording device.

BACKGROUND

Information is recorded on a magnetic recording medium such as an HDD (Hard Disk Drive) using a magnetic head including a magnetic device. It is desired to improve the characteristics of magnetic devices, magnetic heads, and magnetic recording devices.

DETAILED DESCRIPTION

Figure 1:
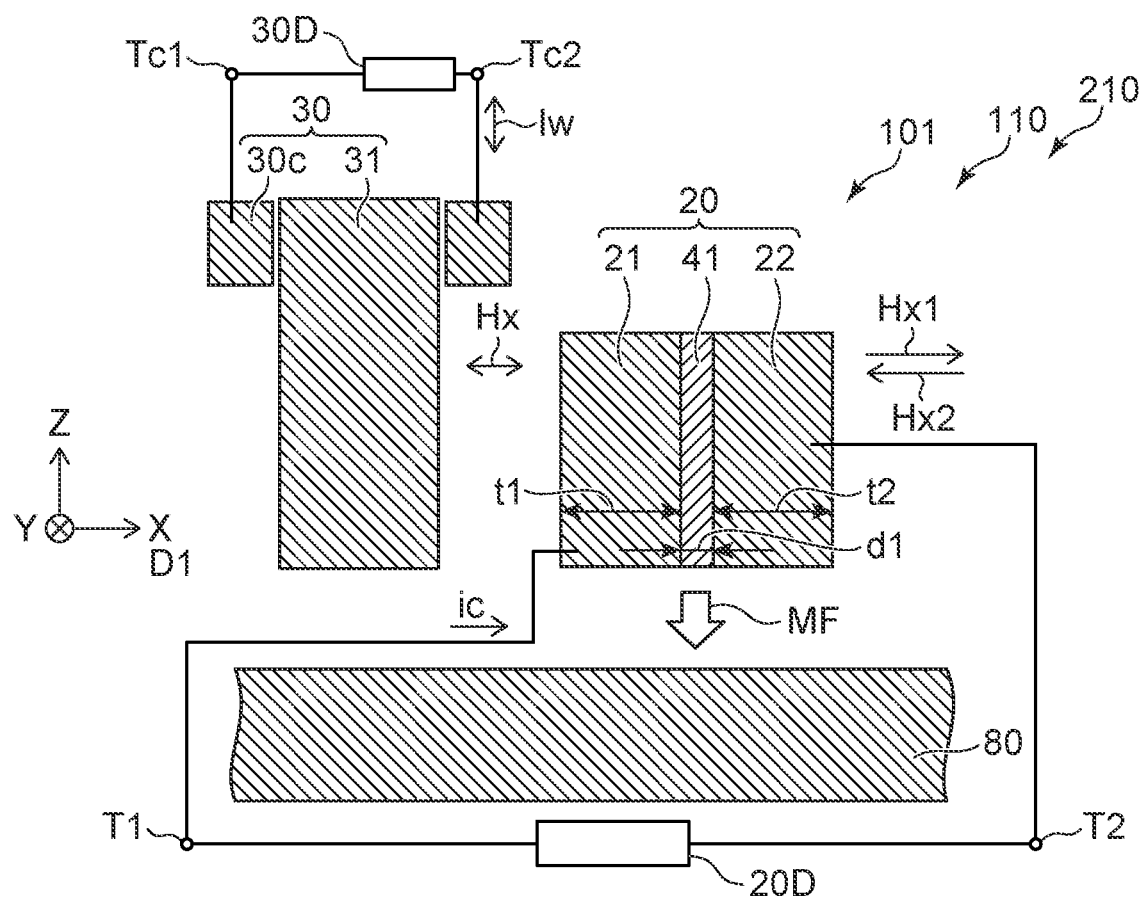
FIG. 1 is a schematic cross-sectional view illustrating a magnetic device according to a first embodiment.

According to one embodiment, a magnetic device includes a magnetic element including a first magnetic layer and a second magnetic layer, and a magnetic field generator. The magnetic field generator is configured to perform a first transition operation and a second transition operation. In the first transition operation, a first state where a first magnetic field is generated is configured to transit to a second state where a second magnetic field is generated. In the second transition operation, the second state is configured to transit to the first state. The first magnetic field includes a first component in a first orientation from the first magnetic layer to the second magnetic layer. The second magnetic field includes a second component in a second orientation from the second magnetic layer to the first magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic device according to a first embodiment.

As shown in FIG. 1, a magnetic device 101 according to the embodiment includes a magnetic element 20 and a magnetic field generator 30.

The magnetic element 20 includes a first magnetic layer 21 and a second magnetic layer 22. In this example, the magnetic element 20 further includes a first intermediate layer 41. The first intermediate layer 41 is provided between the first magnetic layer 21 and the second magnetic layer 22. The first intermediate layer 41 is, for example, electrically conductive. The first intermediate layer 41 is nonmagnetic. An element current ic is configured to flow through the magnetic element 20. The element current ic flows along a stacking direction in the magnetic element 20.

A first direction D1 from the first magnetic layer 21 to the second magnetic layer 22 is defined as an X-axis direction. One direction perpendicular to the X-axis direction is defined as a Z-axis direction. A direction perpendicular to the X-axis direction and the Z-axis direction is a Y-axis direction. The stacking direction is along the first direction D1.

The magnetic field generator 30 is configured to perform a first transition operation and a second transition operation, which will be described later. In these operations, a magnetic field Hx is generated from the magnetic field generator 30. In one example, the magnetic field generator 30 may include an electromagnet. For example, the magnetic field generator 30 includes a first magnetic pole 31 and a coil 30c. For example, a recording current Iw flows through the coil 30c. The magnetic field Hx is generated from the first magnetic pole 31 according to the recording current Iw. The magnetic field Hx is applied to the magnetic element 20.

Figure 2A:
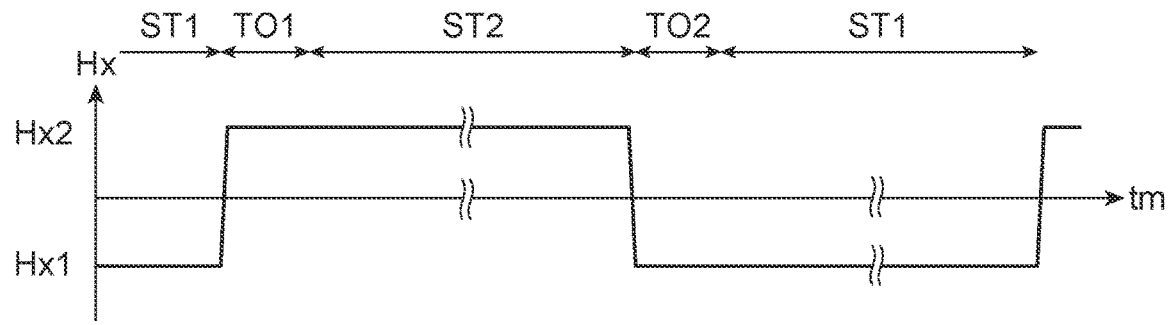
FIGS. 2A to 2C are schematic diagrams illustrating the operation of the magnetic device according to the first embodiment.
Figure 2B:
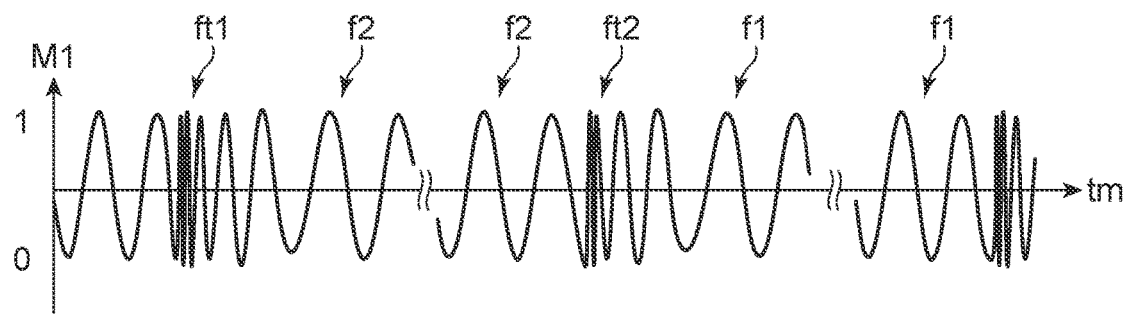
Figure 2C:
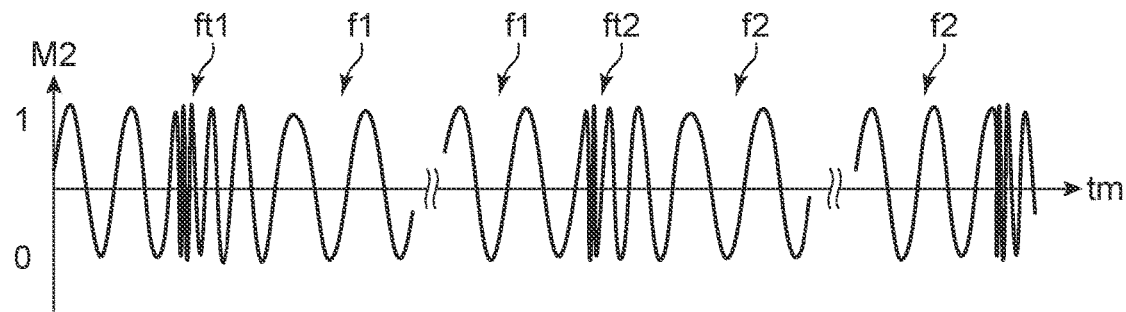

FIGS. 2A to 2C are schematic diagrams illustrating the operation of the magnetic device according to the first embodiment.

The horizontal axis of these figures is time tm. The vertical axis in FIG. 2A corresponds to the magnetic field Hx generated from the magnetic field generator 30. The vertical axis in FIG. 2B corresponds to the direction of a first magnetization M1 of the first magnetic layer 21. The vertical axis in FIG. 2C corresponds to the direction of a second magnetization M2 of the second magnetic layer 22.

As shown in FIG. 2A, the magnetic field generator 30 is configured to perform the first transition operation TO1 and the second transition operation TO2. In the first transition operation TO1, a first state ST1 transits to a second state ST2. In the second transition operation TO2, the second state ST2 transits to the first state ST1. In the first state ST1, a first magnetic field Hx1 is generated. In the second state ST2, a second magnetic field Hx2 is generated.

As shown in FIG. 1, the first magnetic field Hx1 includes a first component in a first orientation from the first magnetic layer 21 to the second magnetic layer 22. The second magnetic field Hx2 includes a second component in a second orientation from the second magnetic layer 22 to the first magnetic layer 21. The second orientation is opposite to the first orientation.

By the first transition operation TO1 and the second transition operation TO2, the orientation of the magnetic field MF emitted from the magnetic element 20 changes. For example, when the magnetic field MF is applied to the magnetic recording medium 80, the orientation of magnetization of the magnetic recording medium 80 can be changed. Thereby, information can be recorded on the magnetic recording medium 80. For example, the magnetic device 101 can be applied to a magnetic head 110. Information can be recorded on the magnetic recording medium 80 by the magnetic head 110 including the magnetic device 101 described above.

For example, in the above operations, an element current ic flows through the magnetic element 20. The orientation of the magnetic field MF emitted from the magnetic element 20 changes by the spin of these magnetic layers based on the element current ic and the change in the orientation of the magnetic field Hx generated from the magnetic field generator 30.

For example, the first magnetic layer 21 is provided between the magnetic field generator 30 and the second magnetic layer 22. In the embodiment, the second magnetic layer 22 may be provided between the magnetic field generator 30 and the first magnetic layer 21.

For example, one of the first magnetic layer 21 and the second magnetic layer 22 has positive polarization. The other of the first magnetic layer 21 and the second magnetic layer 22 has negative polarization.

In one example, the first magnetic layer 21 includes a first element including at least one selected from the group consisting of Fe, Co, and Ni. The second magnetic layer 22 includes the first element and a second element. The second element includes at least one selected from the group consisting of Cr, V, Mn, Ti, and Sc. The first magnetic layer 21 does not include the second element. Alternatively, a first concentration of the second element in the first magnetic layer 21 is lower than a second concentration of the second element in the second magnetic layer 22. By such a configuration, the first magnetic layer 21 tends to have positive polarization, and the second magnetic layer 22 tends to have negative polarization.

In a case where the first magnetic layer 21 has positive polarization and the second magnetic layer 22 has negative polarization, the element current ic may have the orientation from the first magnetic layer 21 to the second magnetic layer 22. In a case where the second magnetic layer 22 has positive polarization and the first magnetic layer 21 has negative 25 polarization, the element current ic may have the orientation from the second magnetic layer 22 to the first magnetic layer 21.

The component (AC component) of the change in the magnetic field MF generated from the magnetic element 20 corresponds to a temporal change in the first magnetization M1 and the second magnetization M2 illustrated in FIGS. 2B and 2C. The oscillation frequency of the magnetic field MF corresponds to the oscillation frequencies of the first magnetization M1 and the second magnetization M2.

For example, in the first state ST1, the element current ic flows through the magnetic element 20. In the first state ST1, the first magnetic field Hx1 generated from the magnetic field generator 30 is applied to the magnetic element 20. In the first state ST1, the frequency of the magnetic field MF generated from the magnetic element 20 is defined as a first oscillation frequency f1. For example, the first oscillation frequency f1 is 10 GHz or less.

For example, in the second state ST2, the element current ic flows through the magnetic element 20. In the second state ST2, the second magnetic field Hx2 generated from the magnetic field generator 30 is applied to the magnetic element 20. In the second state ST2, the frequency of the magnetic field MF generated from the magnetic element 20 is defines as a second oscillation frequency f2. For example, the second oscillation frequency f2 is 10 GHz or less.

In the first transition operation TO1, while the element current ic flows through the magnetic element 20, the magnetic field Hx generated from the magnetic field generator 30 changes from the first magnetic field Hx1 to the second magnetic field Hx2. The oscillation frequency of the magnetic field MF generated from the magnetic element 20 in the first transition operation TO1 is defined as a first transition operation oscillation frequency ft1. The first transition operation oscillation frequency ft1 is higher than the first oscillation frequency f1 and higher than the second oscillation frequency f2.

In the second transition operation TO2, while the element current ic flows through the magnetic element 20, the magnetic field Hx generated from the magnetic field generator 30 changes from the second magnetic field Hx2 to the first magnetic field Hx1. The oscillation frequency of the magnetic field MF generated from the magnetic element 20 in the second transition operation TO2 is defined as a second transition operation oscillation frequency ft2. The second transition operation oscillation frequency ft2 is higher than the first oscillation frequency f1 and higher than the second oscillation frequency f2.

By the first transition operation TO1 and the second transition operation TO2 having such high oscillation frequencies, the orientation of the magnetic field MF is switched. Thereby, for example, the magnetization of the magnetic recording medium 80 can be changed. Target information can be recorded on the magnetic recording medium 80.

The first oscillation frequency f1 may be, for example, ⅓ or less of a resonance frequency of the magnetic recording medium 80. The second oscillation frequency f2 may be ⅓ or less of the resonance frequency of the magnetic recording medium 80.

In a first reference example, a recording magnetic field generated from a magnetic pole is applied to the magnetic recording medium 80, and a high frequency magnetic field generated from the magnetic element 20 is applied to the magnetic recording medium 80. The magnetization of the magnetic recording medium 80 is easily changed by the high-frequency magnetic field, and the magnetization of the magnetic recording medium 80 is controlled in a direction according to the recording magnetic field. In the first reference example, for example, MAMR (Microwave Assisted Magnetic Recording) is implemented. In the first reference example, the frequency of the magnetic field MF emitted from the magnetic element 20 is constant.

In contrast, in the embodiment, the frequency of the magnetic field MF emitted from the magnetic element 20 changes in the transition operations. The magnetization of the magnetic recording medium 80 can be stably changed. For example, high recording density can be obtained. According to the embodiments, it is possible to provide a magnetic device, a magnetic head, and a magnetic recording device whose characteristics can be improved.

In the embodiment, the first magnetic layer 21 and the second magnetic layer 22 preferably have negative perpendicular magnetic anisotropy. This makes it easy to obtain the desired change in the magnetic field MF.

A thickness t1 (see FIG. 1) of the first magnetic layer 21 may be, for example, not less than 5 nm and not more than 15 nm. A thickness t2 (see FIG. 1) of the second magnetic layer 22 may be, for example, not less than 5 nm and not more than 15 nm. It becomes easy to obtain stable operation. These thicknesses are lengths along the first direction D1.

A distance d1 (see FIG. 1) between the first magnetic layer 21 and the second magnetic layer 22 may be not less than 2 nm and not more than 10 nm. It becomes easy to obtain stable operation. The distance d1 is a length along the first direction D1.

The first intermediate layer 41 may be in contact with the first magnetic layer 21 and the second magnetic layer 22. For example, the distance d1 corresponds to a thickness of the first intermediate layer 41.

The first intermediate layer 41 includes, for example, at least one selected from the group consisting of Cu, Al, Au, Ag, and Cr.

As described above, the first transition operation TO1 and the second transition operation TO2 are performed depending on the recording current Iw flowing through the coil 30c. For example, by changing the orientation of the recording current Iw, the first transition operation TO1 and the second transition operation TO2 are performed.

The magnetic head 110 according to the embodiment includes the magnetic device 101 according to the embodiment.

Second Embodiment

As shown in FIG. 1, a magnetic recording device 210 according to the embodiment includes the magnetic head 110 and the magnetic recording medium 80. A first information is recorded on the magnetic recording medium 80 by the first transition operation TO1. A second information is recorded on the magnetic recording medium 80 by the second transition operation TO2. The second information is different from the first information. The first information is, for example, one of "0" and "1". The second information is other one of "0" and "1".

The magnetic recording device 210 may further include an element circuit 20D. The element circuit 20D is configured to supply the element current ic to the first magnetic layer 21 and the second magnetic layer 22 in the first transition operation TO1 and the second transition operation TO2. The element circuit 20D is configured to supply the element current ic to the first magnetic layer 21 and the second magnetic layer 22 in the first state ST1 and the second state ST2.

In one example of the magnetic recording device 210, the first magnetic layer 21 includes the first element including at least one selected from the group consisting of Fe, Co, and Ni. The second magnetic layer 22 includes the first element and the second element. The second element includes at least one selected from the group consisting of Cr, V, Mn, Ti, and Sc. The first magnetic layer 21 does not include the second element. Alternatively, the first concentration of the second element in the first magnetic layer 21 is lower than the second concentration of the second element in the second magnetic layer 22. In this case, the element current ic flows from the first magnetic layer 21 to the second magnetic layer 22.

In the magnetic recording device 210, in the first state ST1, the first oscillation frequency f1 of the magnetic field MF generated from the magnetic element 20 is 10 GHz or less. In the second state ST2, the second oscillation frequency f2 of the magnetic field MF generated from the magnetic element 20 is 10 GHz or less.

In the magnetic recording device 210, the first transition operation oscillation frequency ft1 of the magnetic field MF generated from the magnetic element 20 in the first transition operation TO1 is higher than the first oscillation frequency f1 and higher than the second oscillation frequency f2. The second transition operation oscillation frequency ft2 of the magnetic field MF generated from the magnetic element 20 in the second transition operation TO2 is higher than the first oscillation frequency f1 and higher than the second oscillation frequency f2.

In the magnetic recording device 210, the first oscillation frequency f1 may be ⅓ or less of the resonance frequency of the magnetic recording medium 80. The second oscillation frequency f2 may be ⅓ or less of the resonance frequency. The resonance frequency is, for example, not less than 20 GHz and not more than 100 GHz.

The magnetic recording device 210 may further include a recording circuit 30D. The magnetic field generator 30 includes, for example, the first magnetic pole 31 and the coil 30c. The recording circuit 30D is configured to supply the recording current Iw to the coil 30c. The first transition operation TO1 and the second transition operation TO2 are performed according to the recording current Iw.

Figure 3:
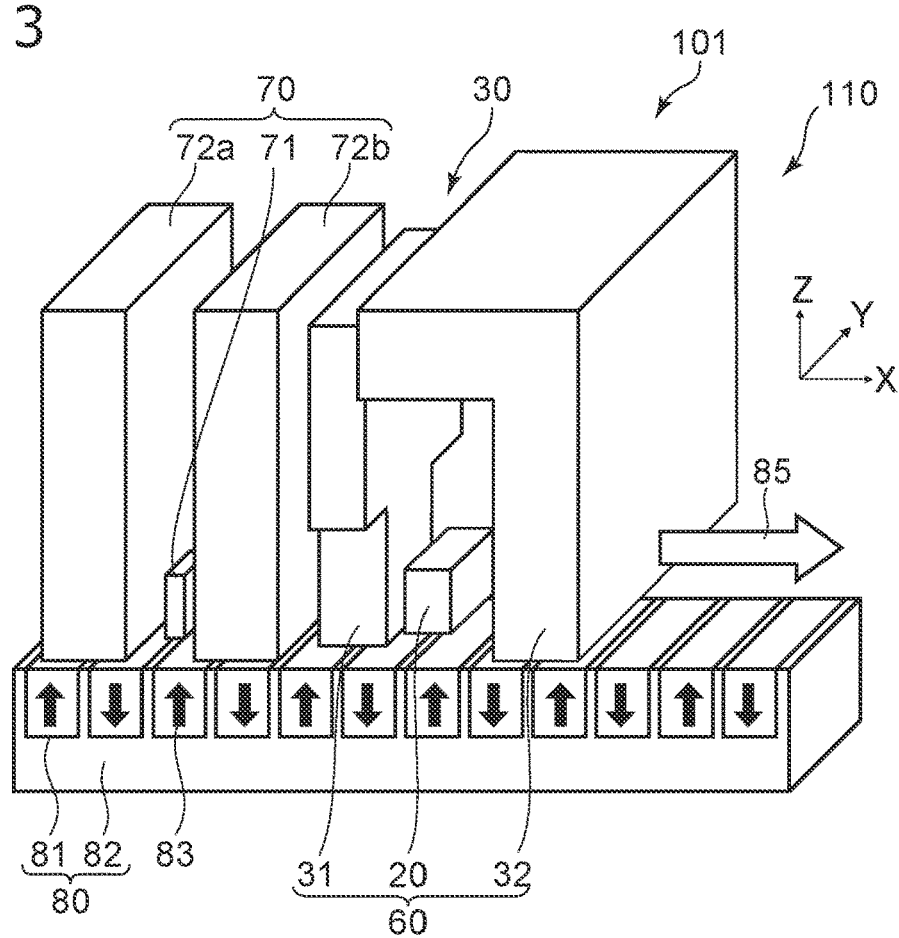
FIG. 3 is a schematic perspective view illustrating the magnetic recording device according to a second embodiment.

FIG. 3 is a schematic perspective view illustrating the magnetic recording device according to the second embodiment.

As shown in FIG. 3, in the magnetic recording device 210 according to the embodiment, the magnetic head 110 is used together with the magnetic recording medium 80. In this example, the magnetic head 110 includes a recording section 60 and a reproducing section 70. The recording section 60 includes the magnetic device 101.

Information is recorded on the magnetic recording medium 80 by the recording section 60 of the magnetic head 110. The reproducing section 70 reproduces information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal according to the magnetization 83 of the magnetic recording layer 81.

As shown in FIG. 3, the magnetic recording medium 80 moves relative to the magnetic head 110 in a medium movement direction 85. The magnetic head 110 controls information corresponding to the magnetization 83 of the magnetic recording layer 81 at an arbitrary position. The magnetic head 110 reproduces information corresponding to the magnetization 83 of the magnetic recording layer 81 at an arbitrary position.

The recording section 60 (or the magnetic device 101) may further include the second magnetic pole 32. The magnetic element 20 is provided between the first magnetic pole 31 and the second magnetic pole 32. By providing the second magnetic pole 32, the magnetic field Hx (see FIG. 1) generated from the magnetic field generator 30 is effectively applied to the magnetic element 20. The second magnetic pole 32 may be included in the magnetic field generator 30.

Figure 4:
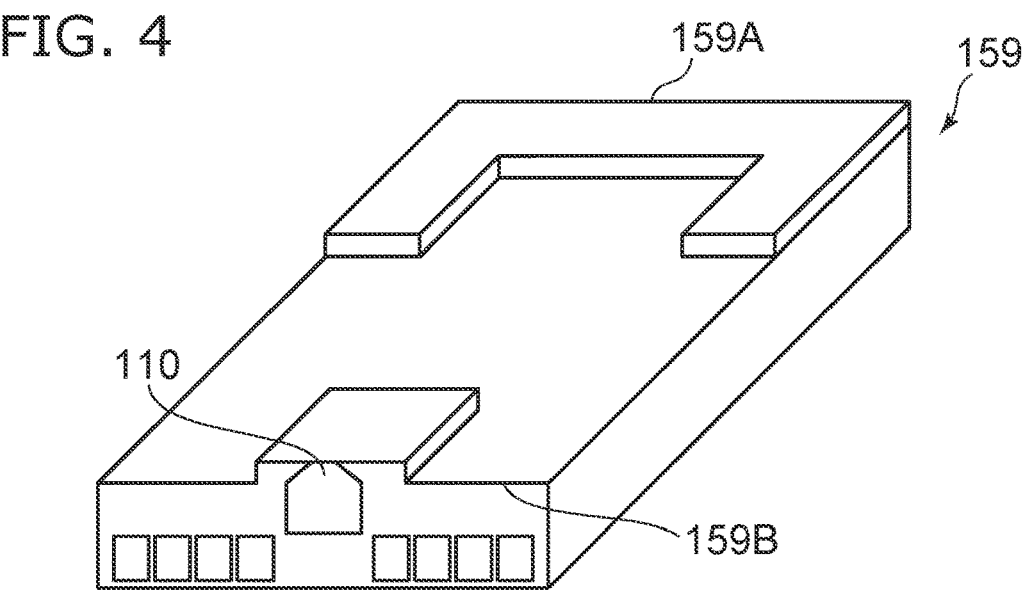
FIG. 4 is a schematic perspective view illustrating a part of the magnetic recording device according to the second embodiment.

FIG. 4 is a schematic perspective view illustrating a part of the magnetic recording device according to the second embodiment.

FIG. 4 illustrates a head slider.

The magnetic head 110 is provided on the head slider 159. The head slider 159 includes, for example, $Al_2O_3$/TIC. The head slider 159 moves relative to the magnetic recording medium while flying over or in contact with the magnetic recording medium.

The head slider 159 has, for example, an air inflow side 159A and an air outflow side 159B. The magnetic head 110 is arranged on the side surface of the air outflow side 159B of the head slider 159. Thereby, the magnetic head 110 moves relative to the magnetic recording medium while floating above or in contact with the magnetic recording medium.

Figure 5:
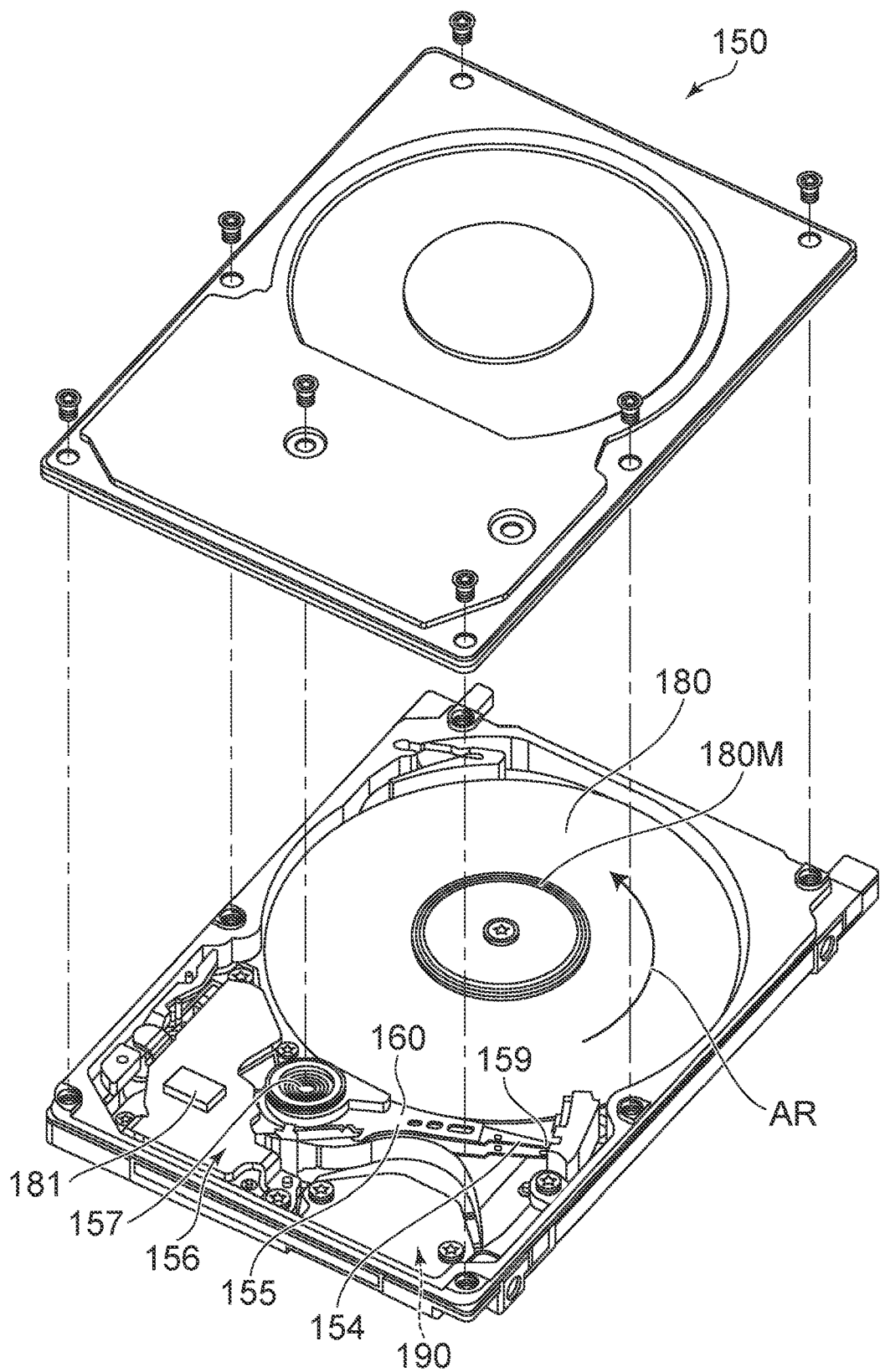
FIG. 5 is a schematic perspective view illustrating the magnetic recording device according to the embodiment.

FIG. 5 is a schematic perspective view illustrating the magnetic recording device according to the embodiment.

Figure 6A:
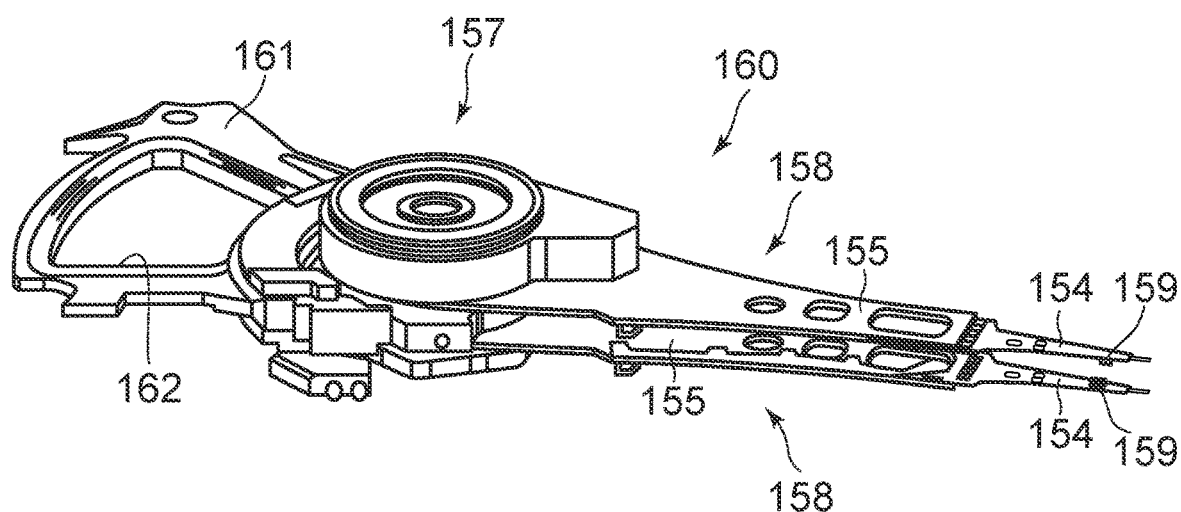
FIGS. 6A and 6B are schematic perspective views illustrating a part of the magnetic recording device according to the embodiment.
Figure 6B:
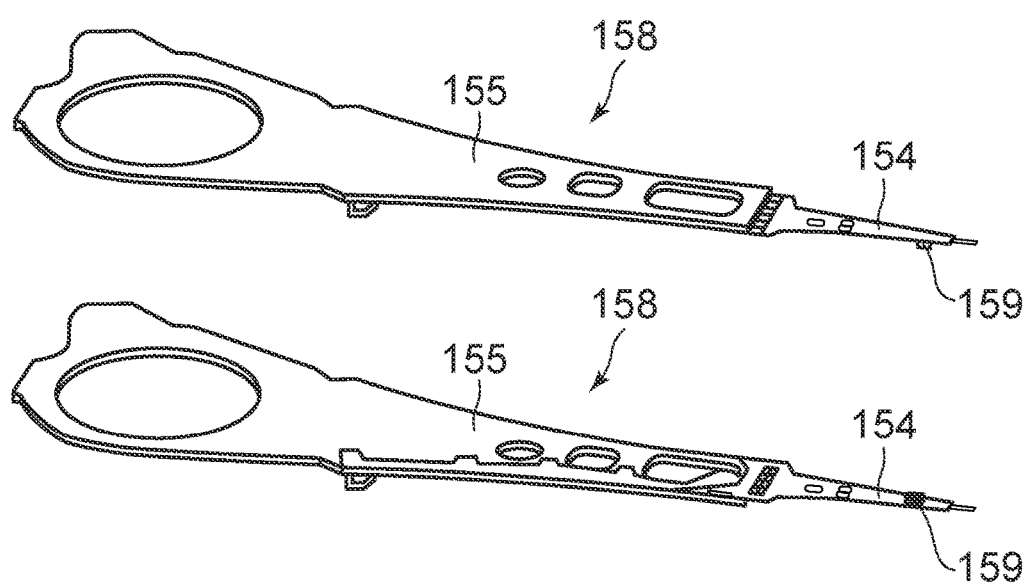

FIGS. 6A and 6B are schematic perspective views illustrating a part of the magnetic recording device according to the embodiment.

The magnetic recording device may be a magnetic recording/reproducing device. As shown in FIG. 5, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 6A is an enlarged perspective view of the head stack assembly 160, illustrating the configuration of a part of the magnetic recording device.

FIG. 6B is a perspective view illustrating the magnetic head assembly (head gimbal assembly: HGA) 158 that forms part of the head stack assembly 160.

As shown in FIG. 6A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 6B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Technical proposals.

(Technical Proposal 1)
A magnetic device, comprising:
a magnetic element including a first magnetic layer and a second magnetic layer; and
a magnetic field generator,
the magnetic field generator being configured to perform a first transition operation and a second transition operation,
in the first transition operation, a first state being configured to transit to a second state, a first magnetic field being generated in the first state, a second magnetic field being generated in the second state,
in the second transition operation, the second state being configured to transit to the first state,
the first magnetic field including a first component in a first orientation from the first magnetic layer to the second magnetic layer, and
the second magnetic field including a second component in a second orientation from the second magnetic layer to the first magnetic layer.

(Technical Proposal 2)
The magnetic device according to Technical proposal 1, wherein
one of the first magnetic layer and the second magnetic layer has positive polarization, and
the other of the first magnetic layer and the second magnetic layer has negative polarization.

(Technical Proposal 3)
The magnetic device according to Technical proposal 1, wherein
the first magnetic layer includes a first element including at least one selected from the group consisting of Fe, Co, and Ni,
the second magnetic layer includes the first element and a second element, the second element includes at least one selected from the group consisting of Cr, V, Mn, Ti, and Sc, and
the first magnetic layer does not include the second element, or a first concentration of the second element in the first magnetic layer is lower than a second concentration of the second element in the second magnetic layer.

(Technical Proposal 4)
The magnetic device according to Technical proposal 3, wherein
in the first state and the second state, an element current flows in an orientation from the first magnetic layer to the second magnetic layer,
in the first state, a first oscillation frequency of the magnetic field generated from the magnetic element is 10 GHz or less, and
in the second state, a second oscillation frequency of the magnetic field generated from the magnetic element is 10 GHZ or less.

(Technical Proposal 5)
The magnetic device according to Technical proposal 4, wherein
a first transition operation oscillation frequency of the magnetic field generated from the magnetic element in the first transition operation is higher than the first oscillation frequency and higher than the second oscillation frequency, and
a second transition operation oscillation frequency of the magnetic field generated from the magnetic element in the second transition operation is higher than the first oscillation frequency and higher than the second oscillation frequency.

(Technical Proposal 6)
The magnetic device according to any one of Technical proposals 1-5, wherein
the first magnetic layer and the second magnetic layer have negative perpendicular magnetic anisotropy.

(Technical Proposal 7)
The magnetic device according to any one of Technical proposals 1-5, wherein
the first magnetic layer is provided between the magnetic field generation section and the second magnetic layer, or
the second magnetic layer is provided between the magnetic field generation section and the first magnetic layer.

(Technical Proposal 8)
The magnetic device according to any one of Technical proposals 1-7, wherein
the magnetic element further includes a first intermediate layer provided between the first magnetic layer and the second magnetic layer.

(Technical Proposal 9)
The magnetic device according to Technical proposal 8, wherein
the first intermediate layer is electrically conductive and non-magnetic.

(Technical Proposal 10)
The magnetic device according to Technical proposal 8 or 9, wherein
the first intermediate layer includes at least one selected from the group consisting of Cu, Al, Au, Ag, and Cr.

(Technical Proposal 11)
The magnetic device according to any one of Technical proposals 1-10, wherein a distance between the first magnetic layer and the second magnetic layer is not less than 2 nm and not more than 10 nm.

(Technical Proposal 12)
The magnetic device according to any one of Technical proposals 1-11, wherein
the magnetic field generator includes
first magnetic pole, and
a coil,
the first transition operation and the second transition operation are performed depending on a recording current flowing through the coil.

(Technical Proposal 13)
A magnetic head, comprising:
the magnetic device according to Technical proposal 1.

(Technical Proposal 14)
A magnetic recording device, comprising:
the magnetic head according to Technical proposal 13; and
a magnetic recording medium.

(Technical Proposal 15)
The magnetic recording device according to Technical proposal 14, wherein
a first information is recorded on the magnetic recording medium by the first transition operation, and
a second information different from the first information is recorded on the magnetic recording medium by the second transition operation.

(Technical Proposal 16)
The magnetic recording device according to Technical proposal 15, further comprising:
an element circuit,
the element circuit being configured to supply an element current to the first magnetic layer and the second magnetic layer in the first transition operation and the second transition operation, the first magnetic layer including a first element including at least one selected from the group consisting of Fe, Co, and Ni, the second magnetic layer including the first element and a second element, the second element including at least one selected from the group consisting of Cr, V, Mn, Ti, and Sc, the first magnetic layer not including the second element, or a first concentration of the second element in the first magnetic layer being lower than a second concentration of the second element in the second magnetic layer, and the element current being configured to flow from the first magnetic layer to the second magnetic layer.

(Technical Proposal 17)

The magnetic recording device according to Technical proposal 16, wherein in the first state, a first oscillation frequency of the magnetic field generated from the magnetic element is 10 GHZ or less, and in the second state, a second oscillation frequency of the magnetic field generated from the element current is 10 GHz or less.

(Technical Proposal 18)

The magnetic recording device according to Technical proposal 17, wherein a first transition operation oscillation frequency of the magnetic field generated from the magnetic element in the first transition operation is higher than the first oscillation frequency and higher than the second oscillation frequency, and a second transition operation oscillation frequency of the magnetic field generated from the magnetic element in the second transition operation is higher than the first oscillation frequency and higher than the second oscillation frequency.

(Technical Proposal 19)

The magnetic recording device according to Technical proposal 17 or 18, wherein the first oscillation frequency is ⅓ or less of a resonance frequency of the magnetic recording medium, and the second oscillation frequency is ⅓ or less of the resonance frequency.

(Technical Proposal 20)

The magnetic recording device according to any one of Technical proposals 16-19, further comprising:

a recording circuit, the magnetic field generator including
  a first magnetic pole, and
  a coil, the recording circuit being configured to supply a recording current to the coil, and the first transition operation and the second transition operation being performed according to the recording current.

According to the embodiments, a magnetic device, a magnetic head, and a magnetic recording device whose characteristics can be improved can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic devices, magnetic heads, and magnetic recording devices such as magnetic poles, magnetic elements, magnetic layers, magnetic field generators, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic devices, all magnetic heads, and all magnetic recording devices practicable by an appropriate design modification by one skilled in the art based on the magnetic devices, the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic device, comprising:
  a magnetic element including a first magnetic layer and a second magnetic layer; and
  a magnetic field generator,
  the magnetic field generator being configured to perform a first transition operation and a second transition operation,
  in the first transition operation, a first state being configured to transit to a second state, a first magnetic field being generated in the first state, a second magnetic field being generated in the second state,
  in the second transition operation, the second state being configured to transit to the first state,
  the first magnetic field including a first component in a first orientation from the first magnetic layer to the second magnetic layer, and
  the second magnetic field including a second component in a second orientation from the second magnetic layer to the first magnetic layer,
  wherein
  the first magnetic layer includes a first element including at least one selected from the group consisting of Fe, Co, and Ni,
  the second magnetic layer includes the first element and a second element, the second element includes at least one selected from the group consisting of Cr, V, Mn, Ti, and Sc,
  the first magnetic layer does not include the second element, or a first concentration of the second element in the first magnetic layer is lower than a second concentration of the second element in the second magnetic layer, in the first state and the second state, an element current flows in an orientation from the first magnetic layer to the second magnetic layer, in the first state, a first oscillation frequency of the magnetic field generated from the magnetic element is 10 GHz or less, and in the second state, a second oscillation frequency of the magnetic field generated from the magnetic element is 10 GHz or less.

2. The device according to claim 1, wherein
one of the first magnetic layer and the second magnetic layer has positive polarization, and
the other of the first magnetic layer and the second magnetic layer has negative polarization.

3. The device according to claim 1, wherein
a first transition operation oscillation frequency of the magnetic field generated from the magnetic element in the first transition operation is higher than the first oscillation frequency and higher than the second oscillation frequency, and
a second transition operation oscillation frequency of the magnetic field generated from the magnetic element in the second transition operation is higher than the first oscillation frequency and higher than the second oscillation frequency.

4. The device according to claim 1, wherein
the first magnetic layer and the second magnetic layer have negative perpendicular magnetic anisotropy.

5. The device according to claim 1, wherein
the first magnetic layer is provided between the magnetic field generation section and the second magnetic layer, or
the second magnetic layer is provided between the magnetic field generation section and the first magnetic layer.

6. The device according to claim 1, wherein
the magnetic element further includes a first intermediate layer provided between the first magnetic layer and the second magnetic layer.

7. The device according to claim 6, wherein
the first intermediate layer is electrically conductive and non-magnetic.

8. The device according to claim 6, wherein
the first intermediate layer includes at least one selected from the group consisting of Cu, Al, Au, Ag, and Cr.

9. The device according to claim 1, wherein
a distance between the first magnetic layer and the second magnetic layer is not less than 2 nm and not more than 10 nm.

10. The device according to claim 1, wherein
the magnetic field generator includes
first magnetic pole, and
a coil,
the first transition operation and the second transition operation are performed depending on a recording current flowing through the coil.

11. A magnetic head, comprising:
the magnetic device according to claim 1.

12. A magnetic recording device, comprising:
the magnetic head according to claim 11; and
a magnetic recording medium.

13. The magnetic recording device according to claim 12, wherein
a first information is recorded on the magnetic recording medium by the first transition operation, and
a second information different from the first information is recorded on the magnetic recording medium by the second transition operation.

14. The magnetic recording device according to claim 13, further comprising:
an element circuit,
the element circuit being configured to supply an element current to the first magnetic layer and the second magnetic layer in the first transition operation and the second transition operation,
the first magnetic layer including a first element including at least one selected from the group consisting of Fe, Co, and Ni,
the second magnetic layer including the first element and a second element, the second element including at least one selected from the group consisting of Cr, V, Mn, Ti, and Sc,
the first magnetic layer not including the second element, or a first concentration of the second element in the first magnetic layer being lower than a second concentration of the second element in the second magnetic layer, and
the element current being configured to flow from the first magnetic layer to the second magnetic layer.

15. A magnetic recording device, comprising:
the magnetic head;
a magnetic recording medium; and
an element circuit,
the magnetic device includes:
a magnetic element including a first magnetic layer and a second magnetic layer; and
a magnetic field generator,
the magnetic field generator being configured to perform a first transition operation and a second transition operation,
in the first transition operation, a first state being configured to transit to a second state, a first magnetic field being generated in the first state, a second magnetic field being generated in the second state,
in the second transition operation, the second state being configured to transit to the first state,
the first magnetic field including a first component in a first orientation from the first magnetic layer to the second magnetic layer, and
the second magnetic field including a second component in a second orientation from the second magnetic layer to the first magnetic layer,
wherein
a first information is recorded on the magnetic recording medium by the first transition operation, and
a second information different from the first information is recorded on the magnetic recording medium by the second transition operation,
the element circuit is configured to supply an element current to the first magnetic layer and the second magnetic layer in the first transition operation and the second transition operation,
the first magnetic layer includes a first element including at least one selected from the group consisting of Fe, Co, and Ni,
the second magnetic layer includes the first element and a second element, the second element including at least one selected from the group consisting of Cr, V, Mn, Ti, and Sc,
the first magnetic layer does not include the second element, or a first concentration of the second element in the first magnetic layer is lower than a second concentration of the second element in the second magnetic layer, and the element current is configured to flow from the first magnetic layer to the second magnetic layer, in the first state, a first oscillation frequency of the magnetic field generated from the magnetic element is 10 GHz or less, and in the second state, a second oscillation frequency of the magnetic field generated from the element current is 10 GHz or less.

16. The magnetic recording device according to claim 15, wherein a first transition operation oscillation frequency of the magnetic field generated from the magnetic element in the first transition operation is higher than the first oscillation frequency and higher than the second oscillation frequency, and a second transition operation oscillation frequency of the magnetic field generated from the magnetic element in the second transition operation is higher than the first oscillation frequency and higher than the second oscillation frequency.

17. The magnetic recording device according to claim 15, wherein the first oscillation frequency is ⅓ or less of a resonance frequency of the magnetic recording medium, and the second oscillation frequency is ⅓ or less of the resonance frequency.

18. The magnetic recording device according to claim 14, further comprising:

a recording circuit, the magnetic field generator including a first magnetic pole, and a coil, the recording circuit being configured to supply a recording current to the coil, and the first transition operation and the second transition operation being performed according to the recording current.

* * * * *